United States Patent
Fujita et al.

(10) Patent No.: US 8,159,963 B2
(45) Date of Patent: Apr. 17, 2012

(54) QOS ROUTING METHOD AND QOS ROUTING APPARATUS FOR DETERMINING MEASUREMENT ACCURACY OF COMMUNICATION QUALITY

(75) Inventors: Norihito Fujita, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 444 days.

(21) Appl. No.: 11/927,307

(22) Filed: Oct. 29, 2007

(65) Prior Publication Data

US 2008/0101227 A1   May 1, 2008

(30) Foreign Application Priority Data

Oct. 30, 2006  (JP) ................. 2006-294458

(51) Int. Cl.
*G01R 31/08* (2006.01)
(52) U.S. Cl. ................. 370/252
(58) Field of Classification Search ......... 370/229, 370/230, 232, 241, 252, 254, 253, 235, 351
See application file for complete search history.

(56) References Cited

U.S. PATENT DOCUMENTS

| | | | | |
|---|---|---|---|---|
| 7,388,841 B2 * | 6/2008 | Shao et al. | ...... | 370/238 |
| 2003/0223372 A1 * | 12/2003 | Sanchez et al. | ...... | 370/237 |
| 2004/0042473 A1 * | 3/2004 | Park et al. | ...... | 370/408 |
| 2006/0031469 A1 * | 2/2006 | Clarke et al. | ...... | 709/224 |
| 2007/0022195 A1 * | 1/2007 | Kawano et al. | ...... | 709/225 |
| 2007/0230346 A1 * | 10/2007 | Yamada et al. | ...... | 370/235 |
| 2008/0037425 A1 * | 2/2008 | Pan et al. | ...... | 370/235 |

FOREIGN PATENT DOCUMENTS

| | | |
|---|---|---|
| JP | 2000-244570 | 9/2000 |
| JP | 2003-348155 | 12/2003 |
| JP | 2006-109454 | 4/2006 |
| WO | WO 00/79730 | 6/2000 |
| WO | WO 01/69866 | 3/2001 |
| WO | WO 03/071750 | 2/2003 |
| WO | WO 03/093926 | 11/2003 |

OTHER PUBLICATIONS

Rubenstein, Dan, Detecting Shared Congestion of Flows Via End-to-End measurement .IEEE/ACM Transactions on Networking , vol. 10, No. 3 Jun. 2002.

* cited by examiner

*Primary Examiner* — Kwang B Yao
*Assistant Examiner* — Anh Ngoc Nguyen
(74) *Attorney, Agent, or Firm* — Foley & Lardner LLP

(57) ABSTRACT

A QoS routing apparatus as a node of a logical network to transmit data communicated between user's terminals comprises a relay unit discriminating whether or not flows of received data are measurement flows and transmitting said received data, a quality measurement unit measuring communication quality of links connected the own apparatus using the measurement flows, a quality accuracy setting unit determining measurement accuracy of the communication qualities of the respective links and a path setting unit prescribing transmission amounts of the measurement flows to the respective links. When the path setting unit prescribes the transmission amounts of the measurement flows, it applies a higher rate to a link which has been determined a lower measurement accuracy.

20 Claims, 9 Drawing Sheets

| LINK STATE TABLE | | | |
|---|---|---|---|
| NODE | LINK | ORDINARY COST | MEASUREMENT COST |
| A1 | A1→A2 | 1 | 8 |
| | A1→A3 | 2 | 4 |
| | A1→A4 | 3 | 5 |
| A2 | A2→A3 | 3 | 6 |
| | A2→A4 | 2 | 2 |
| | A2→A1 | 1 | 5 |
| A3 | A3→A4 | 2 | 3 |
| | A3→A1 | 2 | 3 |
| | A3→A2 | 1 | 6 |
| A4 | A4→A1 | 2 | 3 |
| | A4→A2 | 4 | 2 |
| | A4→A3 | 5 | 1 |

FIG.4

ROUTING TABLE A12_1

| DESTINATION IP ADDRESS | FLOW CLASS | IDENTIFIER | NEXT HOP | WEIGHT | IMPARTING LABEL |
|---|---|---|---|---|---|
| 100.2/16 | ORDINARY | any | 2.2.2.2 | 0.3 | 0x02 |
| | | | 3.3.3.3 | 0.5 | 0x32 |
| | | | 4.4.4.4 | 0.2 | 0x42 |
| | MEASUREMENT | dst port=1080 | 2.2.2.2 | 0.14 | 0x02 |
| | | | 3.3.3.3 | 0.29 | 0x32 |
| | | | 4.4.4.4 | 0.57 | 0x42 |
| 100.3/16 | ORDINARY | any | 1.1.1.1 | 0.3 | 0x13 |
| | | | 4.4.4.4 | 0.7 | 0x43 |
| | MEASUREMENT | src addr=200.1.0/24 src port=1024 | 3.3.3.3 | 0.18 | 0x03 |
| | | | 1.1.1.1 | 0.12 | 0x13 |
| | | | 4.4.4.4 | 0.70 | 0x43 |
| ⋮ | ORDINARY | ⋮ | ⋮ | ⋮ | ⋮ |
| | MEASUREMENT | ⋮ | ⋮ | ⋮ | ⋮ |

| \multicolumn{4}{|c|}{LINK STATE TABLE} |
|---|---|---|---|
| NODE | LINK | AVAILABLE BANDWIDTH (MBPS) | MEASUREMENT ACCURACY |
| A1 | A1→A2 | 1 | 0.8 |
|    | A1→A3 | 2 | 0.4 |
|    | A1→A4 | 3 | 0.5 |
| A2 | A2→A3 | 3 | 0.6 |
|    | A2→A4 | 2 | 0.2 |
|    | A2→A1 | 1 | 0.5 |
| A3 | A3→A4 | 2 | 0.3 |
|    | A3→A1 | 2 | 0.3 |
|    | A3→A2 | 1 | 0.6 |
| A4 | A4→A1 | 2 | 0.3 |
|    | A4→A2 | 4 | 0.2 |
|    | A4→A3 | 5 | 0.1 |

FIG.8

CORRELATION TABLE (LOSS RATE) A16_1

| | B12 (A5→A2) | B13 (A5→A3) | B14 (A5→A4) | ... |
|---|---|---|---|---|
| B12 (A5→A2) | | 0.8 | 0.2 | ... |
| B13 (A5→A3) | | | 0.1 | ... |
| B14 (A5→A4) | | | | ... |
| ... | | | | |

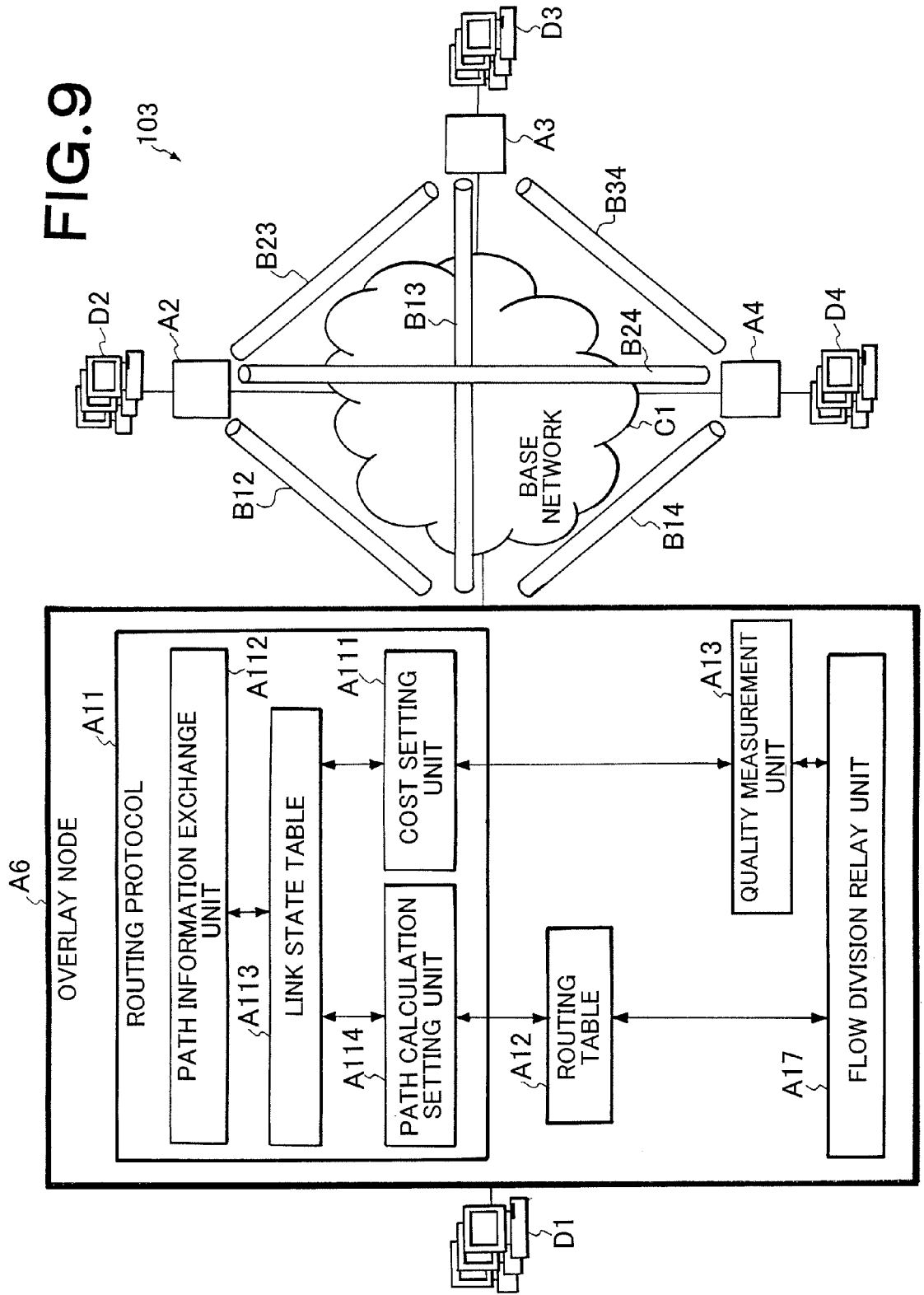

QOS ROUTING METHOD AND QOS ROUTING APPARATUS FOR DETERMINING MEASUREMENT ACCURACY OF COMMUNICATION QUALITY

This application is based upon and claims the benefit of priority from Japanese patent application No. 2006-294458, filed on Oct. 30, 2006, the disclosure of which is incorporated herein in its entirety by reference.

BACKGROUND OF THE INVENTION

1. Field of the Invention

The present invention relates to a QoS routing technology for controlling communication quality of a network, and, more particularly, to a QoS routing technology for a logical network which can select an appropriate path from a plurality of candidate paths such as an overlay network and MPLS (Multi Protocol Label Switching) network.

2. Description of the Related Art

A QoS routing technology realizes a path selection and a path control based on a state of a network to optimize the rate of usage of a network resource and to improve communication quality. For example, Japanese Patent Application Laid-Open Publication No. 2006-109454 and Japanese National-Publication-of-Translated-Version No. 2003-502941 disclose technologies relating to the QoS routing.

Japanese Patent Application Laid-Open Publication No. 2006-109454 discloses a routing method in an overlay network. In the routing method, the cost of a default path (path without overlay node) from a source node to a destination node and the cost of alternate paths other than the default path are measured. The cost referred to here is a value calculated based on communication quality parameters such as a delay of a path, an available bandwidth, and the like to evaluate the path. The method of the publication improves network performance as to a delay, a throughput, and the like by selecting an optimum path based on a result of comparison of two types of costs.

Japanese National-Publication-of-Translated-Version No. 2003-502941 discloses a method of selecting a path in an MPLS network. In the method, the link costs of respective links in a network are changed based on a control strategic parameter and a link usage rate. With this operation, a path is effectively selected according to a network state. As described above, in the QoS routing technology, it is necessary to obtain the quality information of a path or a link.

In a network logically constructed on a base network such as an overlay network, physical nodes such as routers, switches, and the like on the base network are interposed between adjacent overlay nodes. Thus, since quality information is also changed according to a traffic state of the base network underlying the network, it is difficult to obtain accurate quality information only by a local node.

Accordingly, as disclosed also in Japanese Patent Application Laid-Open Publication No. 2006-109454, quality information is obtained by measuring the quality of a path and link. Further, since all the quality information cannot be obtained by a local node in the MPLS network described above, it is necessary to determine the quality information such as a delay, a loss ratio, and the like by measurement.

A method of obtaining the quality information of a path is roughly divided to two types, that is, an active measurement and a passive measurement. The active measurement is a method of measuring communication quality by creating a measurement-dedicated flow separately in addition to a user flow and flowing the measurement-dedicated flow to a to-be-measured path or link. The passive measurement measures quality by observing a user's flow without using a special measurement flow. Further, as one of advanced methods of the passive measurement, there is a method called an inline measurement. The inline measurement measures communication quality by comparing the transmission interval of a packet with the reception interval thereof while adjusting a packet interval of a user's flow.

However, the methods of obtaining quality information by the measurement described above have the following problems.

A first problem resides in that when the active measurement is used as a measurement method, a measurement flow applies an extra load to a network. To measure quality of a path and link, a measurement packet must be periodically transmitted to a network, which causes a measurement traffic to apply a predetermined load to the network. More particularly, when the transmission bandwidth of a path is narrow or when the measurement packet is sent to a jammed path and link, a larger load is applied thereto. As a result, the transmission of an ordinary packet fails.

A second problem resides in that when the passive measurement is used as the measurement method, there is a possibility that measurement accuracy is lowered. In the passive measurement, since a user's traffic is used to measurement, when a sufficient user's traffic does not exist, it is difficult to obtain a significant value as measurement data.

Accordingly, an object of the present invention is to provide a technology for improving measurement accuracy while suppressing the overhead of a measurement traffic in an apparatus for carrying out QoS routing based on a result of measurement of the quality information of a path or link.

SUMMARY OF THE INVENTION

The present invention provides a QoS routing method for a plurality of node apparatuses which form a logical network to transmit data communicated between user's terminals, wherein each of the plurality of node apparatuses carries out steps of: discriminating whether or not flows of received data are measurement flows; measuring communication quality of links connected to the own apparatus using the measurement flows; determining measurement accuracy of the communication quality of the respective links; prescribing transmission amounts of the measurement flows to the respective links; and applying, when the transmission amounts are prescribed, a higher rate to a link which has been determined a lower measurement accuracy.

The present invention further provides a QoS routing apparatus as a node of a logical network to transmit data communicated between user's terminals, comprising: a relay unit discriminating whether or not flows of received data are measurement flows and transmitting said received data; a quality measurement unit measuring communication quality of links connected the own apparatus using the measurement flows; a quality accuracy setting unit determining measurement accuracy of the communication qualities of the respective links; and a path setting unit prescribing transmission amounts of the measurement flows to the respective links, wherein when the path setting unit prescribes the transmission amounts of the measurement flows, it applies a higher rate to a link which has been determined a lower measurement accuracy.

According to the present invention, when QoS routing is carried out, a control can be dynamically carried out to guide a specific flow to a link with the lower measurement accuracy. With this operation, the measurement accuracy of the communication qualities of the respective links can be prevented from being deflected to specific links. As a result, high measurement accuracy can be obtained in all the links. Further, since the flows communicating between the users are used to measure communication quality, a measurement overhead can be suppressed.

BRIEF DESCRIPTION OF THE DRAWINGS

FIG. 2 is an explanatory view of a link state table in the first embodiment of the present invention;

FIG. 4 is an explanatory view of a routing table in the first embodiment of the present invention;

FIG. 6 is an explanatory view of a link state table in the first embodiment of the present invention;

FIG. 8 is an explanatory view of a correlation table of the second embodiment of the present invention; and FIG. 9 is a block diagram showing an arrangement of a third embodiment of the present invention.

DESCRIPTION OF THE PREFERRED EMBODIMENTS

Figure 1:
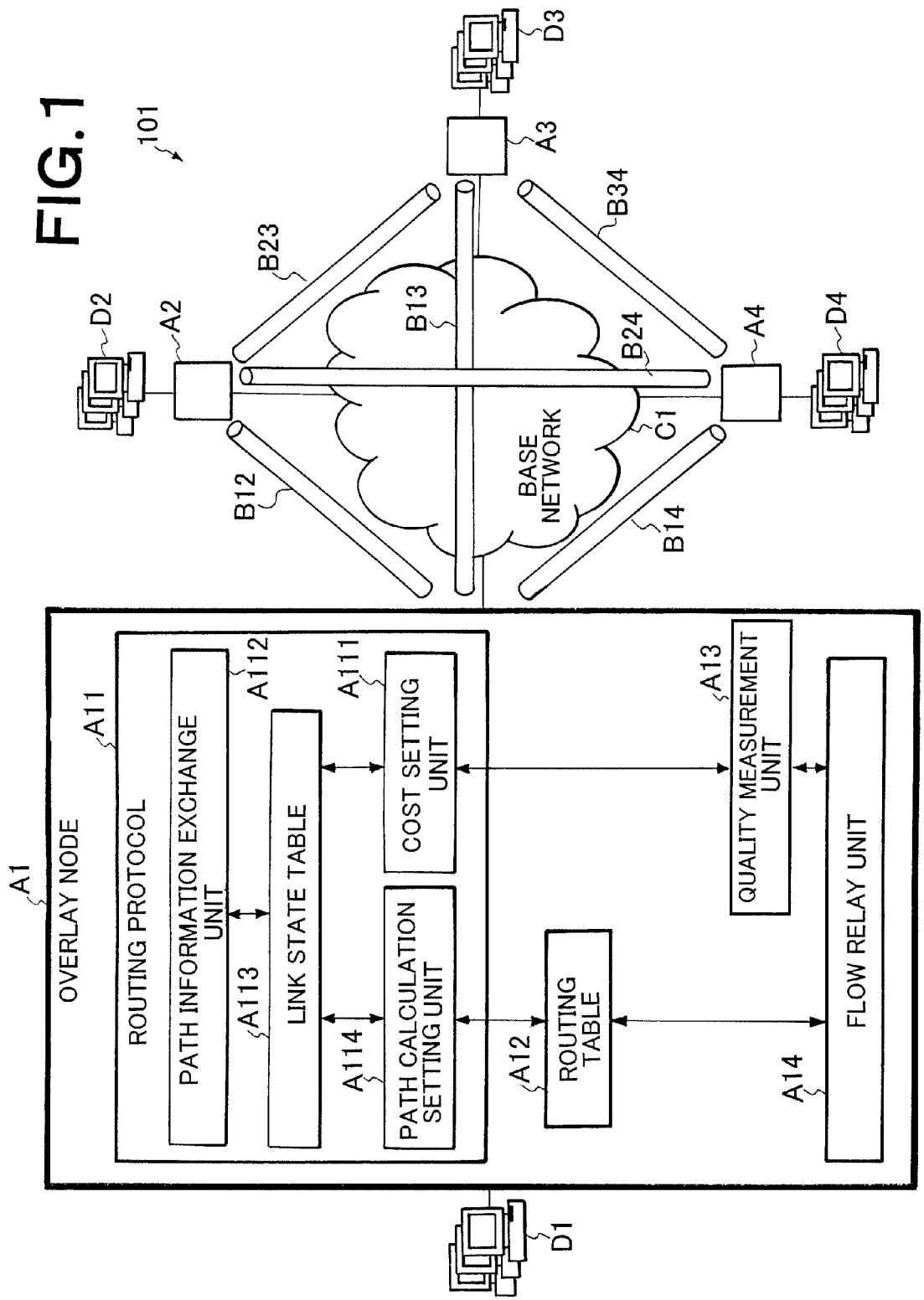
FIG. 1 is a block diagram showing an arrangement of a first embodiment of the present invention.

FIG. 1 shows an arrangement of a first embodiment of the present invention. A system 101 of the embodiment is composed of overlay nodes A1-A4, links B12-B34, a base network C1, and terminal groups D1-D4. The overlay nodes A1-A4 are connected to the physical base network C1 and form an overlay network by links B12-B34 which are logical transmission paths set on the base network C1.

The user's terminal groups D1-D4 are connected to the overlay nodes A1-A4. The terminal groups D1-D4 denote an assembly of equipment such as a client, a server, and the like under the control of the overlay nodes A1-A4, respectively and carry out a communication with each other.

Since each of the overlay nodes A1-A4 has the same arrangement, the arrangement will be explained below as to the overlay node A1 as an example. As shown in FIG. 1, the overlay node A1 includes a routing protocol A11, a routing table A12, a quality measurement unit A13, and a flow relay unit A14.

The routing protocol A11 has a function for exchanging the path information and calculating the paths in an overlay network and includes a cost setting unit A111, a path information exchange unit A112, a link state table A113, and a path calculation/setting unit A114.

The cost setting unit A111 is a component corresponding to a quality accuracy setting unit in a QoS routing apparatus of the present invention. The cost setting unit A111 has a function for setting the costs of respective paths and links used to the calculation of the paths of transmission data. The cost referred to here is the same as that used in an ordinary routing technology and is a value obtained by standardizing the communication quality parameters such as a delay of a path, an available bandwidth, and the like for evaluating the path.

The cost setting unit A111 sets the cost of links which are connected to the overlay node A1 in each one direction. That is, in the overlay node A1, the costs of the links B12, B13, B14, which are directed from the overlay node A1 to the overlay nodes A2, A3, A4, are set. The costs set here are registered to the link state table A11 and further notified to the other overlay nodes by the path information exchange unit A112.

Further, the cost setting unit A111 sets the cost of a specific data flow defined as a measurement flow in the transmission data, in addition to the cost used to the routing of the flow of ordinary transmission data. Hereinafter, the former cost (cost of the ordinary flow) is called as an ordinary cost, and the latter cost (cost of the measurement flow) is called as a measurement cost. Here, flows denote packet groups with a common source and destination IP address and a common port number, and one packet group corresponds to one flow.

The ordinary cost is the same as that used in an ordinary QoS routing apparatus, and the value of the ordinary cost is calculated based on the information of communication quality as described above. When a QoS routing is carried out based on the delay as the quality information, the values of the delays of the respective links can be used as costs as they are. More specifically, when, for example, a delay is 10 milliseconds, the cost is set to "10". With this operation, a delay-based QoS routing, in which a path whose total cost is minimized is handled as a path with a smallest delay, can be carried out.

Further, when, for example, the available bandwidth is used as the quality information, there is a method of setting the inverse numbers of the available bandwidths of the respective links as the values of costs and selecting a path in which the maximum costs of the respective links are equal to or less than a threshold value.

Note that when the ordinary cost is calculated, the cost should be calculated using values which are measured a plurality of times in place of calculating the cost based on a value of the quality information measured once in order to suppress a calculation error. For this purpose, there is contemplated a method of calculating the ordinary cost using, for example, the average of n pieces of values measured within x seconds from a present time t' or a value subjected to a weighted average treatment by weighting respective measured values.

On the other hand, a measurement cost is a value determined based on the measurement accuracy of the quality information of the respective links. When the measurement cost is set, a smaller measurement value is set to a link with lower the measurement accuracy, whereas a larger value is set to a link with higher the measurement accuracy. To increase the measurement accuracy of a link, it is sufficient to increase the number of times of measurement, that is, to increase the number of the flows of the link. Thus, the cost setting unit A111 guides to increase the number of the measurement flows of the link by setting a smaller link cost to a link with lower the measurement accuracy. With this operation, the measurement accuracy of a link whose the measurement accuracy is lowered can be improved.

There are contemplated various methods as to how the measurement accuracy of the quality information is defined. When, for example, a delay is used as quality information, measurement accuracy MA can be determined from the following equation (1) when the measurement time of the n pieces of the values, which are measured within the x seconds from the present time t' in the packets whose delay is measured, is shown by t(k) (k=1, ..., n).

$$MA = \Sigma\_k (1/(t' - t(k))) \quad (1)$$

According to the expression (1), when measurement is carried out a larger number of times in a period near from the present, the measurement accuracy has a larger value. The measurement accuracy can be measured by, for example, a method of using the number of packets used to measurement or the width of a reliability zone, in addition to the above method. Further, a method according to a type and an operation policy of current quality information may be appropriately employed.

The path information exchange unit A112 exchanges the quality information of the paths and links between the respective nodes such as the IP address and interface information of the respective nodes to the other overlay nodes (A2-A4). With this function, topology information and the quality information of the paths and links can be shared between the respective overlay nodes which join to the overlay network. The information as to the paths and links in the network which are exchanged by the information exchange unit A112 is recorded to the link state table A113.

FIG. 2 shows a link state table A113_1 as an example of the link state table A113. The link state table A113_1 records the ordinary cost and the measurement cost of a link (one direction) relating to the overlay nodes (A1-A4) of the overlay network in the unit of the overlay nodes. The illustrated "ordinary cost" and "measurement cost" record the cost values calculated by the method described above. Since the illustrated link state table A113_1 is the table of the overlay node A1, the information set by the overlay node A1 is recorded to the "A1" of the "node". Further, the information as to the other nodes "A2", "A3", and "A4" is recorded based on the information notified from the corresponding overlay nodes (A2-A4) to the overlay node A1.

The path calculation/setting unit A114 has a function for calculating the flow path of each destination of transmission data using the information of the nodes and links held in the link state table A113. In the calculation of the path, the rate of the transmission amounts of the respective links, that is, the rate of the number of flows to be allocated to the respective links is calculated as to each of the ordinary flow and the measurement flow. The calculated rate is reflected to the routing table A12.

The ordinary flow and the measurement flow may use a different path calculation algorithm which is used by the path calculation/setting unit A114. The path calculation algorithm for the ordinary flow may be other algorithm although its example is shown in the explanation of the ordinary cost in the cost setting unit A111. On the other hand, basically, algorithm for guiding the measurement flow to a link with a smaller cost is employed as a calculation algorithm to the measurement flow. Two examples are shown below as the algorithm.

A first example of the algorithm for the measurement flow is a shortest path first (SPF) algorithm, that is, a so-called Dijkstra algorithm. According to the algorithm, the measurement flow is guided to flow to a path in which the measurement costs set to the respective links have a smallest sum.

A second example is an algorithm arranged such that after a path up to a certain destination is restricted to one hop path (no node is interposed) or a two hop (one node is interposed) path, a smaller value is selected from the measurement costs set to the links of each path, the number of flows to each path is allocated based on the inverse number rate of the selected value.

Figure 3:
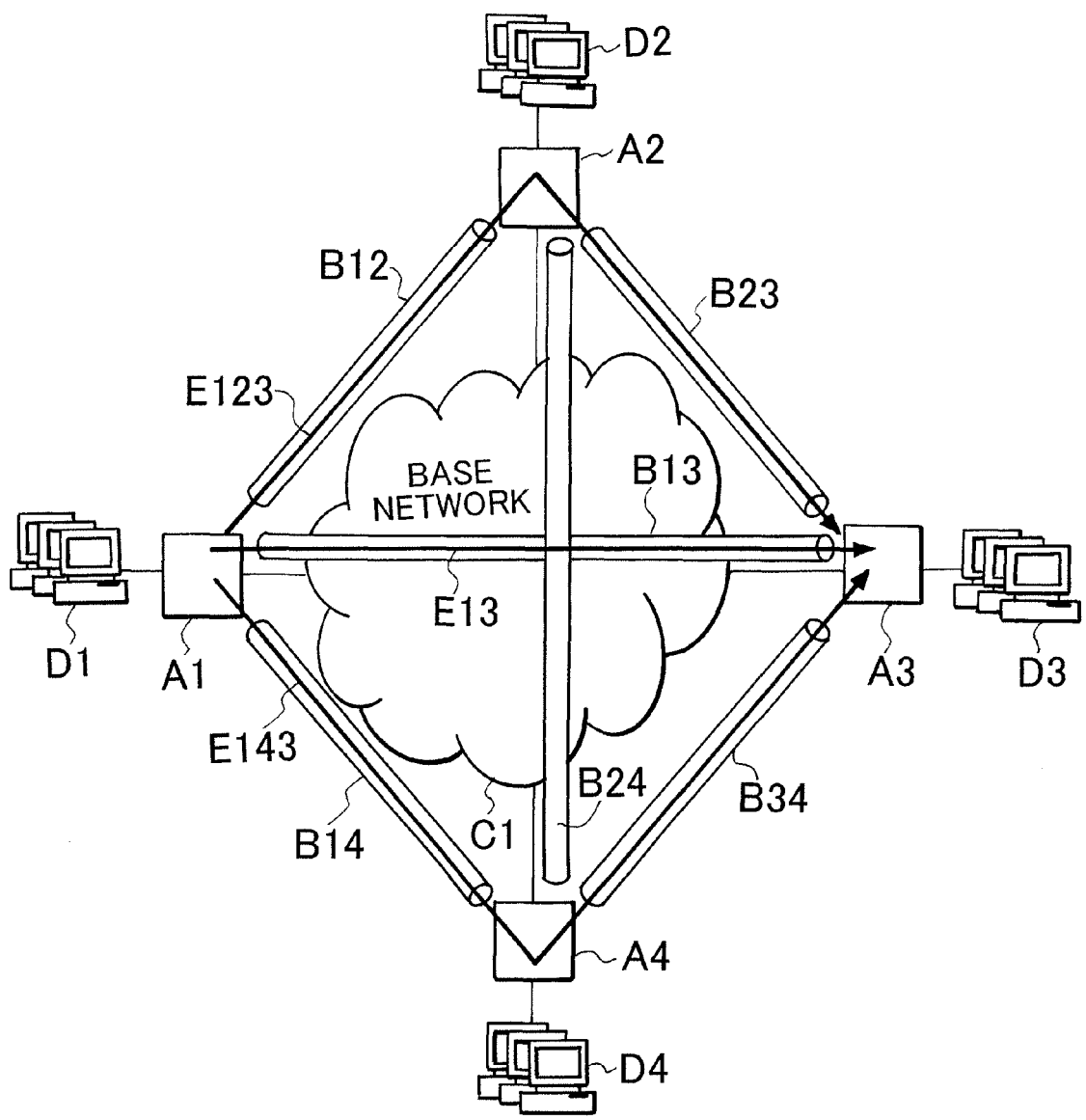
FIG. 3 is an explanatory view of candidate paths in the first embodiment of the present invention.

Here, an example will be explained in which the overlay node A1 calculates a path to the overlay node A3 to the measurement flow using the algorithm of the second example. FIG. 3 shows path candidates from the overlay node A1 to the overlay node A3. The candidates are three paths E13, E123, and E143. The path E13 is a path of the one hop from the overlay node A1 to the overlay node A3, and further the paths E123 and E143 are paths of the two hops.

When a measurement cost is referred to from the link state table A113_1 show in FIG. 2, the measurement cost to the path E13 (A1 to A3) of the one hop is "4". Further, as to the path E123 of the two hops, reference is made to the information of the two links B12 and B23 (A2 to A3) which constitute the path. The measurement cost of the link B12 (A1 to A2) is "8", and the measurement cost of the link B23 (A2 to A3) is "6". In this case, a smaller value is selected, and "6" is obtained as the measurement cost of the path E123. Likewise, the measurement cost of the path E143 of the two hops is set to "1".

The number of the measurement flows is allocated to the paths E13, E123, and E143 at the rates of "¼", "⅙" and "1", respectively, based on the measurement cost determined as described above. As a result, a largest allocation rate is given to the path E143 in the three paths which have a lowest measurement cost, that is, have a lowest measurement accuracy of quality. With this operation, a larger number of measurement flows flow to the path E143. Note that the allocated rate can be applied to, for example, a Weighted Round Robin (WRR) algorithm. Then, when a new flow passing through the overlay node A1 occurs, any path is set to the new flow by the algorithm.

The path information determined by the path calculation/setting unit A114 is recorded to the routing table A12. FIG. 4 shows a routing table A12_1 as an example of the routing table A12. In the routing table A12_1, path information is set to each of the "ordinary" and "measurement" of the "FLOW CLASS" field in each "DESTINATION IP ADDRESS" field.

An "IDENTIFIER" field is an identifier for identifying the flow class of transmission data. In the illustrated example, a port number, or a combination of an IP address and the port number is set. The illustrated identifier "any" is an entry showing a wild card, and a "dst port" shows a specific destination port number. In the example of FIG. 4, the flow whose destination port number is "1080" ("dst port=1080") in the flows whose destination IP address is "100.2/16" is defined as the measurement flow, and the flow with the other destination port number ("any") is defined as the ordinary flow. Further, in the illustrated other example, the flow whose destination IP address ("src addr") is "200.1.0/24" as well as whose source port number ("src port") is "1024" in the flows whose destination IP address is "100.3/16" is defined as the measurement flow.

Note that a destination port number of a communication, which frequently uses the overlay network, is preferably set as the destination port number applied to the measurement flow. As a more specific example when, for example, Napster®, which is a P2P (Peer to Peer) file sharing application, is used, a port number "8875" or "7777" can be set as the identifier of the measurement flow.

In FIG. 4, as paths ("NEXT HOP") to the measurement flow of the destination IP address "100.2/16", there are three paths "2.2.2.2" corresponding to the overlay node A2, "3.3.3.3" corresponding to the overlay node A3, and "4.4.4.4" corresponding to the overlay node A4.

Further, a "WEIGHT" is set to the respective paths. The weight is a value corresponding to the allocation rate of the number of flows calculated by the path calculation/setting unit A114 described above. In the illustrated example, weights "0.14", "0.29", and "0.57" for the measurement flow of the destination IP address "100.2/16" are recorded to the above three paths. Any of the flows is set to each of the measurement flows with the destination IP address "100.2/16".

An "IMPARTING LABEL" of FIG. 4 shows the value of a label imparted to each packet of the flow for fixing the flow to a specific path. This is the same as a label used in an MPLS network path for identifying a path. Routing for uniquely designating the path from the input side node to the out side node of a flow can be carried out by using the label in place of hop by hop routing for selecting a path to each one hop.

The quality measurement unit A13 has a function for carrying out the passive measurement using the flow relayed by the flow relay unit A14. A type of the quality information to be measured here includes the delay, the loss rate, the available bandwidth, and the like of a link between the overlay node A1 and the adjacent nodes (A2-A4). The measured quality information is delivered to the cost setting unit A111 and used to set the ordinary cost and the measurement cost described above.

The flow relay unit A14 receives a packet transmitted from a terminal group such as the terminal group D1 under the control of the overlay node A1. To any of the ordinary flow and the measurement flow a received packet belongs is discriminated based on an identifier such as the destination port number of the packet. Further, the transmission path of the packet is determined based on the routing table A12. At the time, the label ("IMPARTING LABEL" in FIG. 4) is imparted to fix a path when necessary.

Various types of layers are contemplated as the layer relayed by the flow relay unit A14. A case of an IP level relay, a case of a UDP level relay, and a case of a TCP level relay will be explained below.

In the IP level relay, the flow relay unit A14 receives an IP packet from the terminal group D1 and transmit it. Further, the flow relay unit A14 encapsulates the received packet by an IP header for the overlay network and transmits it, when necessary. In the UDP level relay, a UDP connection from the terminal group D1 is terminated once, and another UDP connection is stretched again between overlay nodes, thereby a relay is carried out in a UDP connection level. In the TCP level relay, a TCP connection from the terminal group D1 is terminated once, and another TCP connection is stretched again between the overlay nodes, thereby a relay is carried out in a TCP connection level.

Further, the flow relay unit A14 includes an API (Application Program Interface), and the API handles the measurement information such as the delay, the loss rate, the available bandwidth, and the like of each link. Specifically, delay information, packet loss information, and control information as to a packet interval adjustment are transmitted and received between the API and the quality measurement unit A13.

Here, the flow relay unit A14 includes a measurement function called as an inline measurement and measures the use available bandwidth in the quality measurement unit A13. The incline measurement is a function for measuring the available bandwidth while adjusting the intervals of packets to be transmitted. An example, in which the available bandwidth is measured using the inline measurement technology, will be explained below.

On a transmission side, a pair of packets $(p\_i, p\_(i+1))$ with a packet size M are transmitted at an interval of $x\_i$ seconds, and the interval $y\_i$ of an acknowledgement response (Ack) packet to the respective packets is monitored. Then, a transmission rate $(M/x\_i)$ is compared with an arrival rate $(M/y\_i)$ on a receiving side. When "$M/x\_i=M/y\_i$" is satisfied, it is assumed that the available bandwidth is "$M/x\_i$" or more, whereas when "$M/x\_i>M/y\_i$" is satisfied, it is assumed that the available bandwidth is less than "$M/x\_i$". As described above, the available bandwidth can be estimated by transmitting the pair of packets at various intervals "$x\_k$" and statistically processing the result of measurement.

As shown in FIG. 1, the links B12-B34 are virtual transmission paths which connect the overlay nodes A1-A4, respectively and are emulated by encapsulating packets such as IP tunnels and the like. The topology of the overlay network may be a full mesh topology which has links between all the nodes or a partial mesh topology which has links between only a part of the nodes. When the former full mesh topology is used, quality is measured between all the overlay node pairs. Then, a link, which is used as a path for actually transmitting a flow, is determined from between measured pairs of overlay nodes. Further, when it is desired to previously restrict the path of the flow such as when a particular link is removed from path candidates, the latter partial mesh topology is preferable. In this case, quality is measured only between a pair of the overlay nodes which correspond to the link previously set as a usable link.

The base network C1 is a physical network acting as the base of a virtual overlay network. In, for example, the overlay network, a packet, which flows in the paths A1->A2->A3, is encapsulated by a header including the source/destination address of the base network C1. Then, the packet is handled as a packet transmitted from the overlay node A1 to the overlay node A2 and using the overlay node A2 as a destination in the zone of the node A1 to the node A2 in the base network C1. Further, in the zone of the node A2 to the node A3, the packet is handles as a packet transmitted from the overlay node A2 to the overlay node A3 and using the overlay node A3 as a destination.

Figure 5:
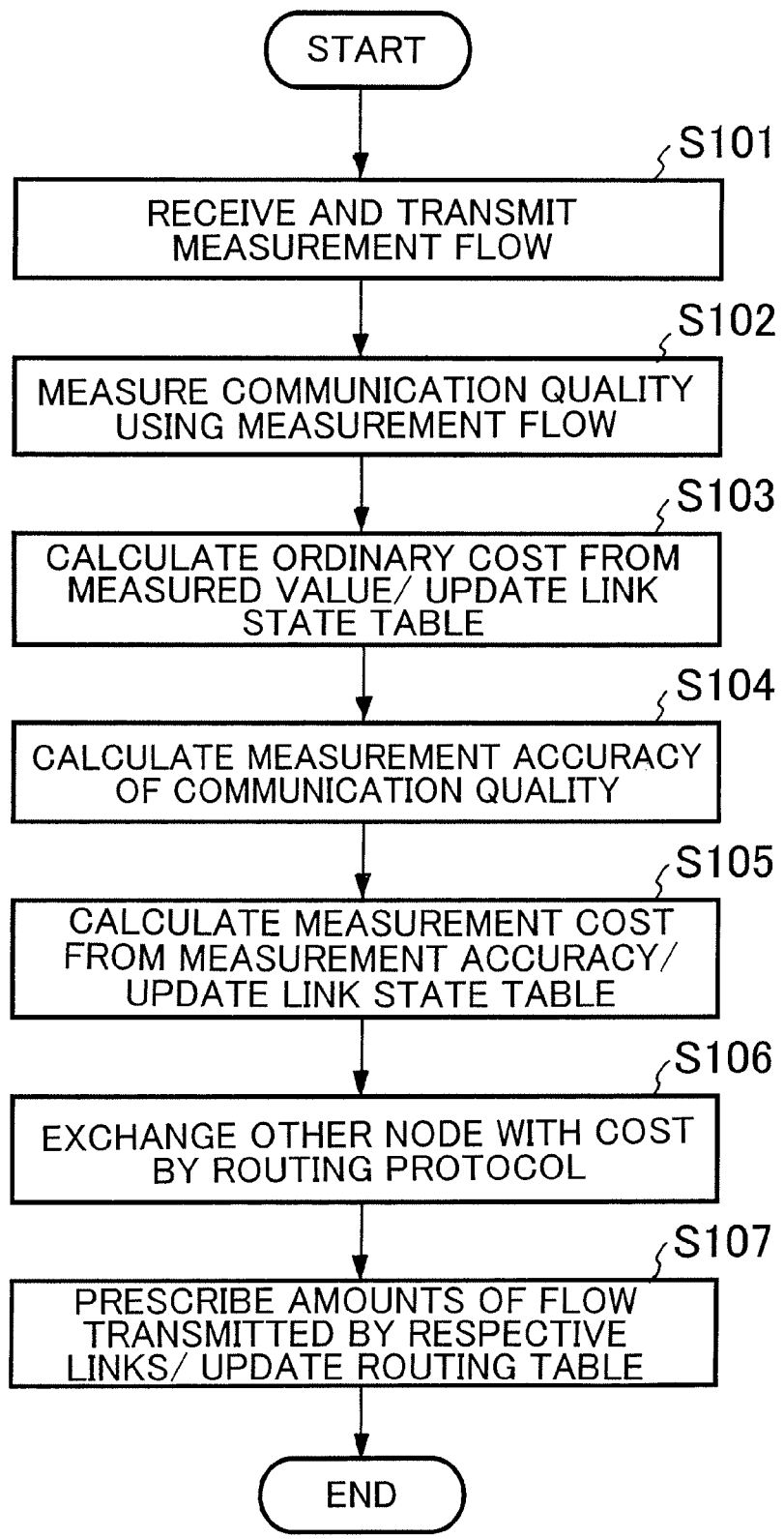
FIG. 5 is a flowchart showing an operation of the first embodiment of the present invention.

The operation of the overlay node A1 as to the measurement flow will be explained in detail referring to a flowchart shown in FIG. 5. When the overlay node A1 receives a packet which is discriminated as the measurement flow by the flow relay unit A14, it determines a next hop and an imparting label based on a relevant entry of the routing table A12 and transmits a received packet (step S101).

The quality measurement unit A13 measures the communication quality of a link through which a measurement flow passes by the passive measurement (step S102). The passive measurement carries out here uses the inline measurement function described above and measures the values of the delays and the available bandwidths of the respective links.

When a result of the quality measurement of the links carries out by the quality measurement unit A13 is obtained, the cost setting unit A111 determines the ordinary cost based on the measurement value and updates the ordinary cost of the link state table A113 (step S103). Note that, as described above, when the cost is calculated, it is possible to reduce the influence of a calculation error by calculating the cost using values calculated a plurality of times.

Next, the cost setting unit A111 calculates the measurement accuracy of the communication quality (step S104). As described in the explanation of the cost setting unit A111, the measurement accuracy is calculated using such an algorithm that measurement accuracy has a larger value as a larger value is calculated during the period near from the present. The cost setting unit A111 updates the measurement cost of the link state table A113 based on the calculated measurement accuracy (step S105). As described above, the measurement cost is updated such that it is set to a smaller value when lower measurement accuracy is calculated. When the updated cost is exchanged between other overlay nodes by the path information exchange unit A112 (step S106).

As to the link of the overlay node A1, the path calculation/setting unit A114 calculates the allocation rate of the ordinary flow and the measurement flow to the respective links based on the cost calculated by the cost setting unit A111 and on the costs notified from the other overlay nodes. Then, the path calculation/setting unit A114 updates the information of the routing table A12 (FIG. 4) using the result of calculation (step S107).

Note that the quality information and the measurement accuracy which are the bases of the ordinary cost and the measurement cost may be used as they are in place of the ordinary cost and the measurement cost as the information set to the link state table A113. FIG. 6 shows an example of the link state table A113 in this case.

The "available bandwidth" and the "measurement accuracy" as quality information are set to the link state table A113_2 shown in FIG. 6 in place of the "ordinary cost" and the "measurement cost" in the link state table A113_1 of FIG. 2. The quality information is not limited to the illustrated usable bandwidth and may be, for example, the delay, the loss ratio, the combination thereof, or the like.

When the link state table A113_2 of FIG. 6 is used, the cost setting unit A111 sets the available bandwidths and the measurement accuracy of the respective links. Further, the path calculation/setting unit A114 calculates a path using the available bandwidth in place of the ordinary cost and using the value of the measurement accuracy in place of the measurement cost. As described above, it is not always necessary for the routing protocol A11 to convert the quality information and the measurement accuracy into the costs and to handle them.

In the embodiment, the measurement flow is automatically guided to a link of a smaller measurement cost. However, when the available bandwidth of a link is relatively small, there is a possibility that congestion occurs in the link because a lot of measurement flows are generated at the same time. To prevent the circumstances, an upper limit may be previously set to the amount of the measurement flow to the respective links, and when the upper limit is exceeded, a current link may be switched to a link whose measurement cost is smaller next to the current link, that is, to a link whose allocation weight is larger next to the current link.

As described above, the respective overlay nodes A1-A4 of the first embodiment set the measurement cost for the measurement flow used to the passive measurement, separately from the ordinary cost used to the QoS routing of the ordinary flow. Then, a lower measurement cost is set to a link with lower measurement accuracy. With this operation, since the measurement flow is dynamically guided to a link with lower measurement accuracy, the number of times of measurement of the link is increased to thereby increase the measurement accuracy.

Therefore, according to the embodiment, even if the passive measurement is used to the quality measurement of the QoS routing, a high measurement accuracy can be obtained in all the links while preventing the measurement accuracy of the respective links from deflecting to a specific link. Further, a measurement load does not increase different from the active measurement, and a measurement overhead can be suppressed.

Figure 7:
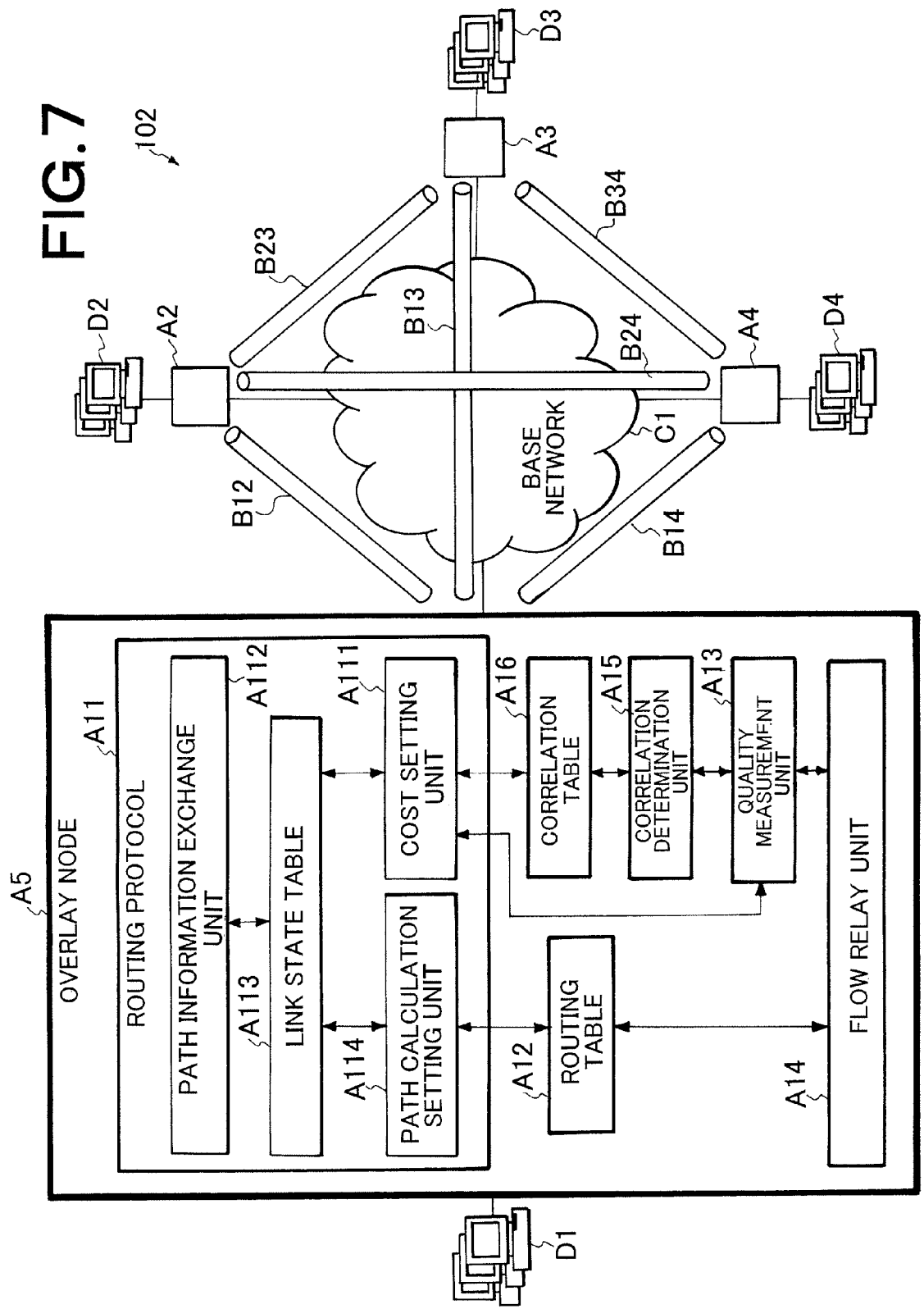
FIG. 7 is a block diagram showing an arrangement of a second embodiment of the present invention.

FIG. 7 shows an arrangement of a second embodiment of the present invention. Overlay nodes (A2-A5) in a system 102 of the embodiment are the same as the overlay nodes (A1-A4) in the first embodiment (FIG. 1) described above except that a correlation determination unit A15 and a correlation table A16 is added thereto. Note that the overlay node A1 of FIG. 1 is replaced with the overlay node A5 in the embodiment.

The correlation determination unit A15 determines whether or not the correlation of a quality change exists among a plurality of links based on the result of measurement of communication quality carried out by the quality measuring unit A13. The correlation of the quality change is caused by that the plurality of links share bottleneck portions each other. The state that the bottleneck portions are shared means a state that the plurality of links on the overlay network share the same nodes of links on a base network C1 as well as the shared nodes and links become the bottleneck portions which deteriorate the communication quality of the respective links. When the bottleneck portions common to the plurality of links exist as described above, the correlation of the quality change is liable to appear among the plurality of links. Accordingly, whether or not the bottleneck portions are shared can be determined by calculating the correlation.

The correlation of the quality change will be described more specifically. There is contemplated a case in which, for example, links B12, B13 share a bottleneck portion in the base network C1 in an overlay network of FIG. 7. In this case, there is observed a phenomenon that when the loss rate of the link B12 is increased by congestion in the bottleneck portion, the loss rate of the other link B13 is also increased at the same time. The degree of correlation of the loss rate between the link pair (B12 and B13) is determined by observing the phenomenon.

When the degree of correlation is determined using two values, for example, "0" and "1" showing the presence or absence of correlation, a measurement error increases. Therefore, it is preferable to express the degree of correlation by numerical values between "0" and "1". A method disclosed in, for example, D. Rubenstein, J. Kurose, D. Towsley, "Detecting Shared Congestion of Flows Via End-to-End Measurement", IEEE/ACM Transactions on Networking, Vol. 10, No. 3, June 2002, and the like may be applied as a method of determining the degree of correlation. Further, a method of using information, which shows that between any nodes of the base network C1 the respective links of the overlay network are located, may be used as another method of determining the degree of correlation. However, the method can be applied only to a system in which the topology and the path information of the base network C1 can be previously grasped.

The result of determination carried out by the correlation determination unit A15 is registered to the correlation table A16 to each link pair. FIG. 8 shows a correlation table A16_1 as an example of the correlation table A16. The correlation table A16_1 shows the degree of correlation of the loss rate, and it can be found that the degree of correlation of the loss rate between, for example, a link B12 (A5 to A2) and a link B13 (A5 to A3) is "0.8".

A cost setting unit A111 of the embodiment sets an ordinary cost and a measurement cost making use of the degree of correlation recorded to the correlation table A16. This is a control carried out such that when the cost of one of links is updated to a link pair with a relatively high degree of correlation, the content of update is reflected to the cost of the other link. A threshold value is previously set to the degree of correlation to determine whether or not the control is to be carried out. Then, the control is carried out when the degree of correlation of a target link pair is equal to or higher than the threshold value. Further, when the degree of correlation of the target link pair is smaller than the threshold value, it is regarded that the degree of correlation of both the links is low, and thus current cost values are maintained without carrying out the control.

When the ordinary cost of one of the links of the link pair is updated, the ordinary cost of the other link is updated based on the updated ordinary cost and the degree of correlation. It is assumed as an example that the current ordinary costs of the links B12 and link B13 are "20" and "30", respectively. Further, it is also assumed that the degree of correlation of these two links is "0.8" higher than the previously set threshold value "0.5". When the ordinary cost of the link B12 is updated from "20" to "15", the ordinary cost "30" of the other link B13 is updated using the ordinary cost "20" and the degree of correlation "0.8" of the link B12. Specifically, the ordinary cost "30" of the link B12 is updated to "23" by "(30+20×0.8)/2=23".

Also in the measurement cost, when the measurement cost of one of the links is updated, the measurement cost of the other link is updated. Here, an example of updating the measurement cost will be explained using a method (FIG. 6) of applying the measurement accuracy as it is as the measurement cost. It is assumed now that the measurement accuracy to the links B12 and B13 are "0.1" and "0.7", and that the degree of correlation of both the links is "0.8" higher than the threshold value "0.5".

In that state, since the measurement accuracy of the link B12 is lower than that of the other link B13, the measurement flow is liable to flow to the link B12. However, since the degree of correlation of the link B12 and the link B13 is relatively high, the measurement to the link B12 can be replaced by the measurement to the link B13.

To replace the measurement to the link B12, the measurement accuracy of the link B13 is reflected to the measurement accuracy of the link B12. Specifically, an arithmetic operation of "(0.7×0.8+0.1×(1−0.8))=0.58" is carried out using the measurement accuracy "0.1" (B12) and "0.7" (B13) and the degree of correlation "0.8" of the two links. As a result, the measurement accuracy of the link B12 is updated from "0.1" to "0.58", and the updated measurement accuracy "0.58" is notified to the other node.

According to the above control, the measurement accuracy of the link B12 is changed to a high value at once making use of the degree of correlation in place of gradually increasing the measurement accuracy by increasing the measurement flow to the link B12. Therefore, according to the embodiment, the measurement flow can be directed to a link with lower measurement accuracy as well as with a lower degree of correlation to the other link. As a result, an advantage can be expected in that the measurement accuracy of the overlay network in its entirety can be increased by the smaller number of measurement flows.

FIG. 9 shows an arrangement of a third embodiment of the present invention. Overlay nodes (A2-A4 and A6) in a system 103 of the embodiment are the same as the overlay nodes (A1-A4) in the first embodiment (FIG. 1) described above except that they are provided with a flow division/relay unit A17 in place of the flow relay unit A14. Note that the overlay node A1 of FIG. 1 is replaced with the overlay node A6 in the embodiment.

When a flow from corresponding terminal groups (D1-D4) is relayed, the flow division/relay unit A17 divides the flow to a plurality of flows. It is assumed now that there is one flow in which a certain terminal of the terminal group D1 is used as a source and a certain terminal of the terminal group D3 is used as a destination. In this case, it is possible to carry out such a control that the flow is divided into, for example, to two flows by the overlay node A6, a path through the overlay node A2 is allocated to one of the flows, and a path through the overlay node A4 is allocated to the other flow. Note that the number of divisions is not limited to two and may be more than two.

Further, when the flow division/relay unit A17 receives a divided flow from an overlay network, it carries out a relay processing for forming one flow by assembling the received flow units.

Next, the operation of the flow division/relay unit A17 will be explained using the overlay node A6 as an example. When the flow division/relay unit A17 of the overlay node A6 receives a measurement flow from the terminal group D1, it carries out a processing for dividing the flow to a plurality of flows based on a routing table A12 and transmitting them through a plurality of paths. When the routing table A12_1 of FIG. 4 is referred to as the routing table A12, candidate paths to the measurement flow to a destination IP address "100.2/16" include three paths of next hop IP addresses "2.2.2.2", "3.3.3.3", and "4.4.4.4". Further, weights are "0.14", "0.29", and "0.57", respectively.

One measurement flow with the destination IP address "100.2/16" is divided into three paths according to the rate of weights, and they are transmitted to the three paths. Further, even if there are three paths, it need not to divide the flow into three flows, and, for example, the flow may be divided into the number of paths whose weight is equal to or more than a predetermined threshold value. With this operation, the measurement flow can be controlled such that it is preferentially flown to a path with lower measurement accuracy.

When the flow division/relay unit A17 divides a flow to be transmitted into a plurality of flows, it maps each packet of the flow. With this operation, each packet of the flow is mapped to any one path. However, the mapping may be carried out such that one packet is copied and flown to a plurality of paths in place of the above method. All the flows may be copied or a part of them may be copied. In this case, since overlay nodes on a receiving side receive the same packet from a plurality of flows, the respective nodes detect whether or not a received packet is to be copied. Then, when the received packet is to be copied, a flow assembly/relay processing is carried out by ignoring the second and subsequent duplicate packets.

According to the third embodiment described above, since the flow division/relay unit A17 has a function for dividing one measurement flow into a plurality of flows and flows them to a plurality of path, a larger number of links can be measured by a smaller number of measurement flows, thereby measurement can be carried out effectively. Further, since the measurement flow is flown to a plurality of paths and links at the same time, there is an advantage in that the correlation between the links can be easily measured.

In the embodiment, a destination port number is used as the identifier (FIG. 4) of the measurement flow. However, when the present invention is carried out, a data pattern (signature) included in a received packet, for example, may be used the identifier of the measurement flow in addition to the destination port number. In this case, when a pattern which is detected from a received packet agrees with a previously defined pattern, it is determined that the packet corresponds to the measurement flow.

Although the exemplary embodiments of the present invention have been described in detail, it should be understood that various changes, substitutions and alternatives can be made therein without departing from the sprit and scope of the invention as defined by the appended claims. Further, it is the inventor's intent to retrain all equivalents of the claimed invention even if the claims are amended during prosecution.

What is claimed is:

1. A QoS routing method for a plurality of node apparatuses which form a logical network to transmit data communicated between user's terminals, wherein each of the plurality of node apparatuses carries out steps of:

discriminating whether or not flows of received data are measurement flows that are defined as flows for measuring communication quality of links, the measurement flows being flows communicated between the user's terminals;

measuring communication quality of links connected to the node apparatus using the measurement flows;

determining measurement accuracy of the communication quality of the respective links, the measurement accuracy having a value derived from quantification of accuracy of the communication quality that is measured using the measurement flows, the value being larger as a number of times of the measuring step carried out in a certain period is larger; and prescribing transmission amounts of the measurement flows to the respective links based on the measurement accuracy.

2. A QoS routing method according to claim 1, wherein each of the plurality of node apparatuses further carries out steps of:

standardizing the measurement accuracy of the communication qualities of the respective links to cost values that are used for calculating a path for the measurement flows and are allocated to the respective links; and prescribing the transmission amounts of the measurement flows based on the cost values to the respective links.

3. A QoS routing method according to claim 1, wherein each of the plurality of node apparatuses further carries out steps of:

notifying the other node apparatuses of the logical network of the measurement accuracy of the communication qualities of the respective links; and prescribing transmission amounts of measurement flows to links of the other node apparatuses based on the measurement accuracy notified from the other node apparatuses.

4. A QoS routing method according to claim 1, wherein each of the plurality of node apparatuses selects links of paths as the links to be prescribed the transmission amounts, and wherein said paths are paths whose number of hops in the logical network is less than a predetermined number of hops.

5. A QoS routing method according to claim 1, wherein each of the plurality of node apparatuses further carries out steps of:

measuring correlation value of the communication qualities among the respective links; and changing, when the measurement accuracy of one of a pair of links with a correlation value larger than a threshold value is updated, measurement accuracy of the other of the pair of links based on said measuring accuracy of the one of the pair of links and on said correlation value.

6. A QoS routing method according to claim 1, wherein each of the plurality of node apparatuses divides a measurement flow to be transmitted to links whose prescribed transmission amounts exceed a threshold value according to the rate of the transmission amounts prescribed to said links.

7. A QoS routing method according to claim 1, wherein each of the plurality of node apparatuses transmits duplicates of a measurement flow to be transmitted to links whose prescribed transmission amounts exceed a threshold value according to the rate of the transmission amounts prescribed to said links.

8. A QoS routing method according to claim 1, wherein each of the plurality of node apparatuses further carries out steps of:

setting upper limits to the transmission amounts prescribed to the respective links; and when transmission amount of a specific flow on the link exceeds the upper limit, switching said link to the other link.

9. A QoS routing method according to claim 1, wherein each of the plurality of node apparatuses discriminates whether or not the flows of the received data are the measurement flows by a destination port number of said received data.

10. A QoS routing method according to claim 1, wherein the plurality of node apparatuses form an overlay network as the logical network.

11. A QoS routing apparatus as a node of a logical network to transmit data communicated between user's terminals, comprising:

a relay unit discriminating whether or not flows of received data are measurement flows that are defined as flows for measuring communication quality of links and transmitting said received data, the measurement flows being flows communicated between the user's terminals;

a quality measurement unit measuring communication quality of links connected to the QoS routing apparatus using the measurement flows;

a quality accuracy setting unit determining measurement accuracy of the communication qualities of the respective links, the measurement accuracy having a value derived from quantification of accuracy of the communication quality that is measured using the measurement flows, the value being larger as a number of times of the measuring communication quality carried out in a certain period is larger; and a path setting unit prescribing transmission amounts of the measurement flows to the respective links based on the measurement accuracy.

12. A QoS routing apparatus according to claim 11, wherein:

the quality accuracy setting unit standardizes the measurement accuracy of the communication qualities of the respective links to cost values that are used for calculating a path for the measurement flows and are allocated to the respective links; and the path setting unit prescribes the transmission amounts of the measurement flows based on the cost values to the respective links.

13. A QoS routing apparatus according to claim 11, further comprises a path information exchange unit notifying the other nodes of the logical network of the measurement accuracy of the communication qualities of the respective links, wherein the path setting unit prescribes transmission amounts of measurement flows to links of the other node apparatuses based on the measurement accuracy notified from the other node apparatuses.

14. A QoS routing apparatus according to claim 11, wherein the path setting unit selects links of paths as the links to be prescribed the transmission amounts, and wherein said paths are paths whose number of hops in the logical network is less than a predetermined number of hops.

15. A QoS routing apparatus according to claim 11, further comprising a correlation determination unit measuring correlation value of the communication qualities among the respective links, wherein the quality accuracy setting unit changes, when the measurement accuracy of one of a pair of links with a correlation value larger than a threshold value is updated, measurement accuracy of the other of the pair of links based on said measuring accuracy of the one of the pair of links and on said correlation value.

16. A QoS routing apparatus according to claim 11, wherein the relay unit divides a measurement flow to be transmitted to links whose prescribed amounts exceed a threshold value according to the rate of the transmission amounts prescribed to said links.

17. A QoS routing apparatus according to claim 11, wherein the relay unit transmits duplicates of a measurement flow to be transmitted to links whose prescribed transmission amounts exceed a threshold value according to the rate of the transmission amounts prescribed to said links.

18. A QoS routing apparatus according to claim 11, wherein: the path setting unit sets upper limits to the transmission amounts prescribed to the respective links;

and when transmission amount of a specific flow on the link exceeds the upper limit, the relay unit switches said link to other link.

19. A QoS routing apparatus according to claim 11, wherein the relay unit discriminates whether or not the flows of the received data are the measurement flows by a destination port number of said received data.

20. A QoS routing apparatus according to claim 11, wherein the logical network is an overlay network.

\* \* \* \* \*